(12) United States Patent
Dürst et al.

(10) Patent No.: US 8,198,553 B2
(45) Date of Patent: Jun. 12, 2012

(54) DRAFT SHIELD ASSEMBLY FOR A BALANCE WITH LOCKING ELEMENTS AT THE END OF GUIDE RAILS FOR HOLDING SLIDABLE REMOVABLE SIDE WALLS IN PLACE

(75) Inventors: Balthasar Dürst, Wangen b. Dübendorf (CH); Daniel Mock, Oberengstringen (CH)

(73) Assignee: Mettler-Toledo AG, Greifensee (CH)

( * ) Notice: Subject to any disclaimer, the term of this patent is extended or adjusted under 35 U.S.C. 154(b) by 83 days.

(21) Appl. No.: 12/854,267

(22) Filed: Aug. 11, 2010

(65) Prior Publication Data
US 2010/0326743 A1    Dec. 30, 2010

Related U.S. Application Data

(63) Continuation of application No. PCT/EP2009/051256, filed on Feb. 4, 2009.

(51) Int. Cl.
*G01G 21/28* (2006.01)
*H05K 7/14* (2006.01)
*H05K 7/16* (2006.01)
*E05B 65/44* (2006.01)

(52) U.S. Cl. .... 177/180; 49/409; 312/265.1; 312/265.6; 361/725; 361/726; 361/727; 174/520; 70/159; 70/78; 70/79

(58) Field of Classification Search .................. 177/180, 177/238; 312/257.1, 265.1–265.4, 265.6; 361/725–727; 174/520; 70/159, 78, 79, 70/84; 49/404, 409
See application file for complete search history.

(56) References Cited

U.S. PATENT DOCUMENTS

| | | | | |
|---|---|---|---|---|
| 3,882,947 A | * | 5/1975 | Appius et al. ................. | 177/246 |
| 4,664,207 A | | 5/1987 | Knothe et al. | |
| 5,524,977 A | * | 6/1996 | Orawski ......................... | 312/114 |
| 5,584,549 A | * | 12/1996 | Lybarger et al. .............. | 312/265 |
| 6,041,627 A | * | 3/2000 | Buckland .......................... | 70/78 |
| 6,515,225 B1 | * | 2/2003 | Wright ............................. | 174/50 |
| 6,520,405 B1 | * | 2/2003 | Braxter ........................... | 232/45 |
| 6,566,614 B1 | * | 5/2003 | Fluckiger et al. ............. | 177/180 |
| 6,949,809 B2 | * | 9/2005 | Takimoto et al. .............. | 257/463 |
| 7,146,831 B2 | * | 12/2006 | Antonucci et al. .............. | 70/208 |
| 7,193,164 B2 | * | 3/2007 | Olesen et al. .................. | 177/180 |
| 7,732,720 B2 | * | 6/2010 | Olesen et al. .................. | 177/180 |
| 7,834,278 B1 | * | 11/2010 | Zeiss et al. ..................... | 177/180 |
| 2002/0040814 A1 | | 4/2002 | Luchinger et al. | |
| 2004/0079558 A1 | * | 4/2004 | Luchinger et al. ............ | 177/180 |
| 2006/0185909 A1 | | 8/2006 | Olesen et al. | |
| 2009/0097210 A1 | * | 4/2009 | Su et al. ......................... | 361/726 |
| 2009/0161323 A1 | * | 6/2009 | Liu et al. ....................... | 361/725 |

FOREIGN PATENT DOCUMENTS
JP   7-260559 A   10/1995

\* cited by examiner

*Primary Examiner* — Randy W Gibson
(74) *Attorney, Agent, or Firm* — Standley Law Group LLP

(57) ABSTRACT

A draft shield for a balance, the draft shield having a rear wall and rails extending forward from the top corners of the rear wall. The rails contain guide tracks for a top cover panel and two sidewalls. A draft shield of this design allows for easy cleaning and also permits the parts to be cleaned to be removed without a tool. To this end, a bottom edge of a front wall of the draft shield is inserted into a seat, such that the front wall can then be pivoted into flush alignment against the top cover panel and the sidewalls and can be secured in this position by locking elements arranged at the front ends of the rails.

23 Claims, 3 Drawing Sheets

DRAFT SHIELD ASSEMBLY FOR A BALANCE WITH LOCKING ELEMENTS AT THE END OF GUIDE RAILS FOR HOLDING SLIDABLE REMOVABLE SIDE WALLS IN PLACE

CROSS-REFERENCE TO RELATED APPLICATIONS

This application is a continuation under 35 USC §120 of PCT/EP2009/051256, filed 4 Feb. 2009 which is, in turn, entitled to, and claims, benefit of a right of priority under 35 USC §119 from German patent application 102008008486.7, filed on 11 Feb. 2008. The content of each of these applications is incorporated by reference as if fully recited herein.

TECHNICAL FIELD

The present invention is directed to a draft shield for a balance, the draft shield having a rear wall and rails that contain guide tracks for a top cover panel and sidewalls.

BACKGROUND

Draft shield arrangements in precision balances have the purpose of preventing errors in the weighing result due to air movements. To perform this function, draft shields normally have a rear wall, side walls, a front wall, and a top cover. Such draft shields are either set on top of the balances or solidly attached thereto. In such an arrangement, all of the walls except the rear wall are normally transparent in order to allow an unobstructed view of the weighing device. As a consequence, these transparent walls must be cleaned from time to time when they are dirty. Such draft shields are designed to be opened in order to introduce objects to be weighed into the interior space that is enclosed by the draft shield and to place them onto a load receiver for the weighing object, for example a weighing pan, that is located in the interior space. The load receiver for the object to be weighed is connected to a weighing cell by means of a load transfer member. If the draft shield has a floor, the load transfer member generally must pass through the floor.

A draft shield of the kind described above has been disclosed in JP 07260559 A. This draft shield has a front wall fastened with screws, as well as a top cover panel that can be slid rearward. The latter serves to give access to the space inside the draft shield, and according to the teachings of JP 07260559, it is therefore equipped with an elastic bumper in order to avoid hard shocks. In cleaning this draft shield, it is disadvantageous that the front panel must be unscrewed in order to also allow the two sidewalls to be slid out of their guide tracks. This is time-consuming and requires the use of tools.

Therefore, it would be desirable to improve the design of a draft shield of the kind mentioned at the outset, so that it can be cleaned easily and the parts to be cleaned can be taken off without tools.

SUMMARY OF THE GENERAL INVENTIVE CONCEPT

According to the present invention, this task is solved through a draft shield arrangement where the bottom edge of the front wall can be inserted into a seat, and where the front wall can be pivoted into flush alignment against the top cover and the sidewalls and can be secured in this position by locking elements arranged at the front ends of the rails.

The term "flush alignment" as used herein is intended to mean that the front wall is lying snug against the top cover and the sidewalls, leaving almost no gap through which an air draft could enter and undesirably affect a weighing operation.

The seat into which the front wall is inserted may have different configurations. Such a seat can take the form of a recessed groove or a raised U-profile channel. An arrangement of pins that are set into holes is likewise possible. In principle, any configuration can be used that provides a firm seat for the bottom edge of the front wall and allows the front wall to swivel outward far enough so that it can move past the locking elements in order to be removed.

The locking elements can have a wide range of different configurations as long as they are able to secure the front wall in its closed position.

A draft shield of the present invention allows the front wall to be set in place and removed, as well as secured and unlocked in a simple way, without tools. The top cover panel and the sidewalls can likewise be pulled out of their guide tracks without using tools. Besides allowing the assembly and disassembly to be performed without tools, this has the further advantage that the dismantling and reassembling process requires little space along the rear and the sides of the balance. In short, without needing much space, the inventive concept makes the draft shield easy to assemble and disassemble and thus also easy to clean.

Each of the locking elements may serve to simultaneously lock three wall panels, i.e. the front wall, one sidewall and the top cover. It is conceivable, however, that with different position settings of a locking element, individual wall panels can be released selectively.

For practical convenience, the sidewalls and the top cover can be removed by pulling them out towards the front. In this case it can further be useful if in the closed condition of the draft shield, the front wall lies against the edges of the other walls. This has the result that the front wall secures the other walls against being pulled out inadvertently, and against falling out. In the reverse case, where the sidewalls and the top cover panel lie against the edges of the front wall, they are likewise always secured against falling out when the locking devices are in their closed positions.

As a particularly simple way of providing access to the space inside the draft shield, it can be envisioned that at least one sidewall and/or the top cover panel slide to the rear. Appropriately in this case, the at least one slidable wall is equipped with a stop, so that when the wall panel is in its fully opened position it is still being retained in the guide track. A handle on the slidable wall panel can serve to carry out the sliding movement, and in conjunction with a suitable stationary counterpart, it can also function as an end stop.

As locking elements, one can use sliding latches, swiveling elements, or detent latches. The mechanism can be designed so that each locking element is opened and closed separately, or both sides can be locked from a central place with a single operating element. Detent latches may also be self-locking and may be releasable by pulling or unlocking.

Preferably however, the locking elements are designed so that they include holder elements which can be swiveled between a release position and a locking position for the front wall. This is a simple mechanism which requires little space and is easy to operate.

The holder elements are preferably spring-biased towards their retaining positions wherein in the locking movement, sloped glide ramps create the spring tension which then provides the holding force. Of course, the sloped glide ramps can be arranged on the holder elements as well as on the gliding surface area of the front wall, or they can also be incorporated in the mechanism of the locking elements.

The locking elements can be configured as rotary detent elements. The engagement of the detent, in particular by means of a biasing spring force, can in this case serve as a signal to the operator of the device that the locking position has been reached. There are several possible ways in which this concept can be realized in practice, for example with spring-biased balls that snap into recesses, or one could also envision that the rotary detent elements are formed by surface projections and by recesses in which the projections are seated when the detent element is in the closed state. In this case, the projections or recesses can also have sloped glide ramps. If surface projections are arranged at the ends of the rails, it is possible that the front wall has openings at its topside corners through which the projections pass before they enter into engagement with recesses of the holder elements. As a result, the rotary detent elements have the further advantage that the front wall is positively held in position, which also ensures that the front wall is correctly aligned against the top cover panel and the sidewalls.

The rotary detent elements can be installed on the front ends of the rails or they can be integrally incorporated in the latter. They can be configured for example in such a way that the swivel axles of the locking elements can be set into bore holes of the rails and are held in place through the engagement of at least one stepped-off collar by retaining elements. This is a particularly simple arrangement, which can be assembled quickly and works reliably.

The draft shield as such can of course be configured in different ways. It is possible, for example, that the rear wall can be fastened to the balance and that the seat for the front wall is arranged on the top surface of the balance in such a way that the front wall can be pivoted and locked into position in the manner described above. The sidewalls can likewise be guided by their bottom edges being seated in guide tracks that are arranged on the topside of the balance. However, one could also choose a concept where the sidewalls are guided only in the guide tracks of the rails and are merely resting with their bottom edge on the top surface of the balance, but are held in place in their end positions by slots of the rear wall or of a frame that surrounds the rear wall.

The draft shield can of course also be solidly attached at the topside of the balance, or it can be set on top of the balance by means of a base frame. However, the draft shield preferably includes a floor plate that is arranged on the topside of the balance. The floor plate supports, in this case, the rear wall, and has a passage opening for a load transfer member. The floor plate further includes, in this case, the bottom guides for the sidewalls and the seat for the front wall.

In addition, there can be a frame surrounding the rear wall that would then also hold the upper rails for the guide tracks of the sidewalls. This frame can be connected to the aforementioned floor plate or the aforementioned base frame.

The configurations according to the foregoing description represent only design suggestions, as the inventive concept of setting the front panel in place is independent of the specific configuration of the draft shield. The latter only needs to have a seat to hold the bottom end of the front plate and two locking elements in the area of the top corners.

This does not mean, however, that the two locking elements need to be operable independently of each other. For example, there could be an operating element arranged at the top of the front wall which, in order to effect the locking action, cooperates by way of a locking rod with locking elements that are arranged at the front ends of the rails. Such an operating element could, for example by means of a lever or an eccentric element, move a locking rod which is incorporated in the front panel. In this case, the locking elements at the rails could for example be cutouts which are engaged by the locking rod, similar to a latch. This example, too, is only meant to illustrate that the invention can be put into practice through many concrete design configurations.

BRIEF DESCRIPTION OF THE DRAWINGS

The invention will hereinafter be explained through an example of an embodiment that is illustrated in the drawings, wherein like reference numerals across the several views refer to identical or equivalent features, and wherein.

DETAILED DESCRIPTION OF EXEMPLARY EMBODIMENT(S)

Figure 1:
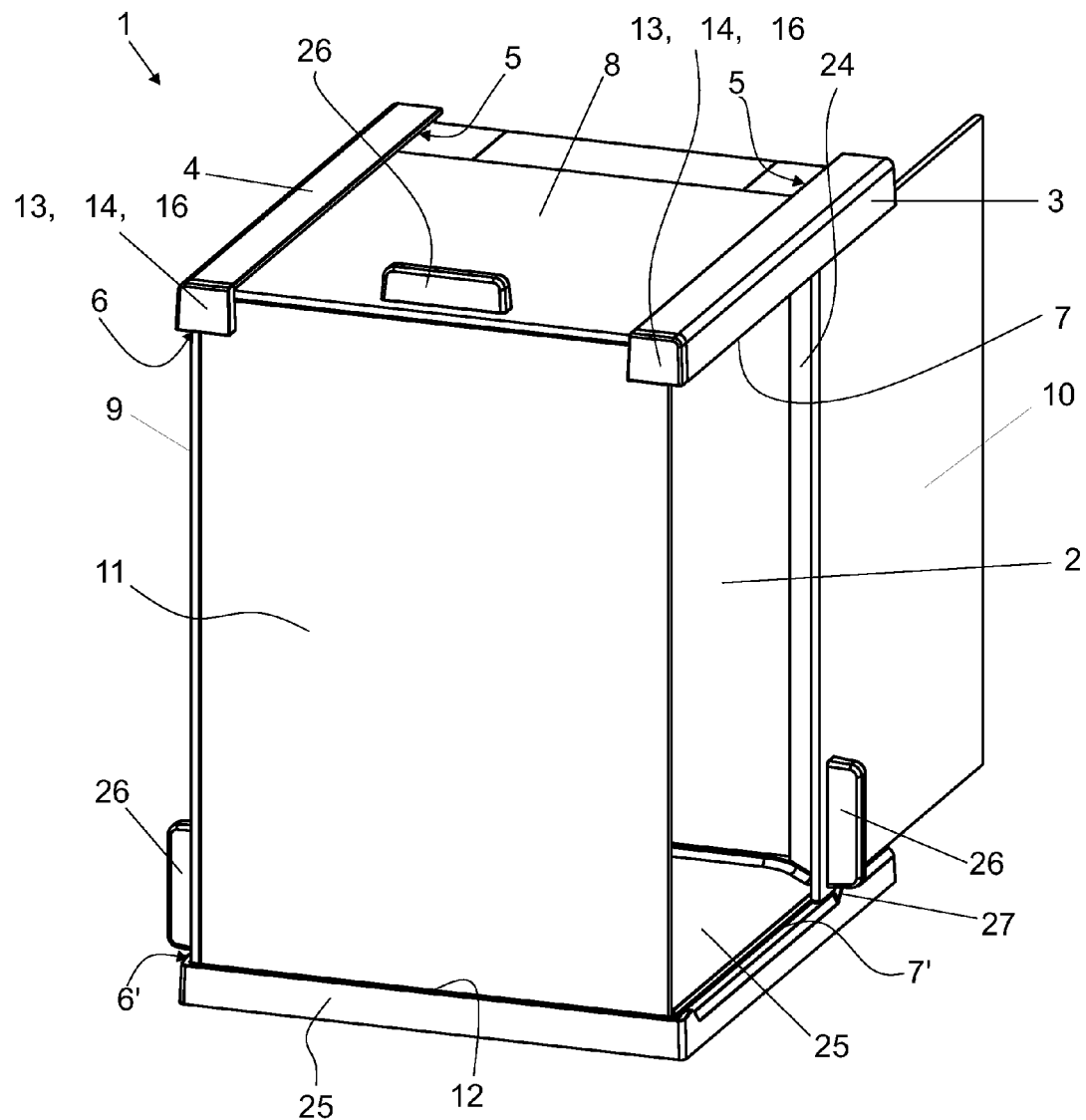
FIG. 1 represents a draft shield with the front wall locked in place.

FIG. 1 shows an exemplary draft shield 1 with a front wall 11 locked in place. This draft shield 1 is configured with a floor plate 25 designed to be seated on the top surface of the balance, carrying at its rearward end a frame 24 which encloses a rear wall 2. The rear wall 2 can be fastened in the frame 24 by means of a retaining device (not shown). Attached to the upper corners of this frame 24 are two rails 3, 4 which extend forward in a horizontal plane. At their undersides, these rails 3, 4 carry guide tracks 6, 7 which, together with guide tracks 6', 7' on the topside of the floor plate, serve to guide sidewalls 9, 10 that are set into the tracks. This is accomplished by inserting the sidewalls 9, 10 from the front into the guide tracks 6, 6' and 7, 7', respectively. Guide tracks 5, which are also arranged in the rails 3, 4 serve to receive the top cover panel 8 which can likewise be inserted from the front.

To slide the sidewalls 9, 10 to the rear in order to open the draft shield 1, there are handles 26 which, in cooperation with end stops 27, serve to ensure that the sidewalls 9, 10 are still safely held in place by the guide tracks 6, 6' and 7, 7' when in the fully open position. The same purpose is served by a handle 26 of the top cover panel 8.

After the top cover panel 8 and the sidewalls 9 and 10 have been installed, the front wall 11 is set into a seat 12, which may have the form of a U-shaped groove or notch. In the illustrated embodiment, this seat 12 is arranged likewise in the floor plate 25. The front wall 11 is then pivoted into place (see arrow 31 in FIG. 2) so that it is in flush alignment with the edges of the sidewalls 9, 10 and the top cover panel 8, whereby the draft shield 1 is made airtight. Next, the assembly is locked by means of the locking elements 13, as will be explained below in further detail, with the holder elements 14 of the locking elements 13 sliding over the corners of the front wall 11 and thereby holding the latter in place.

Figure 2:
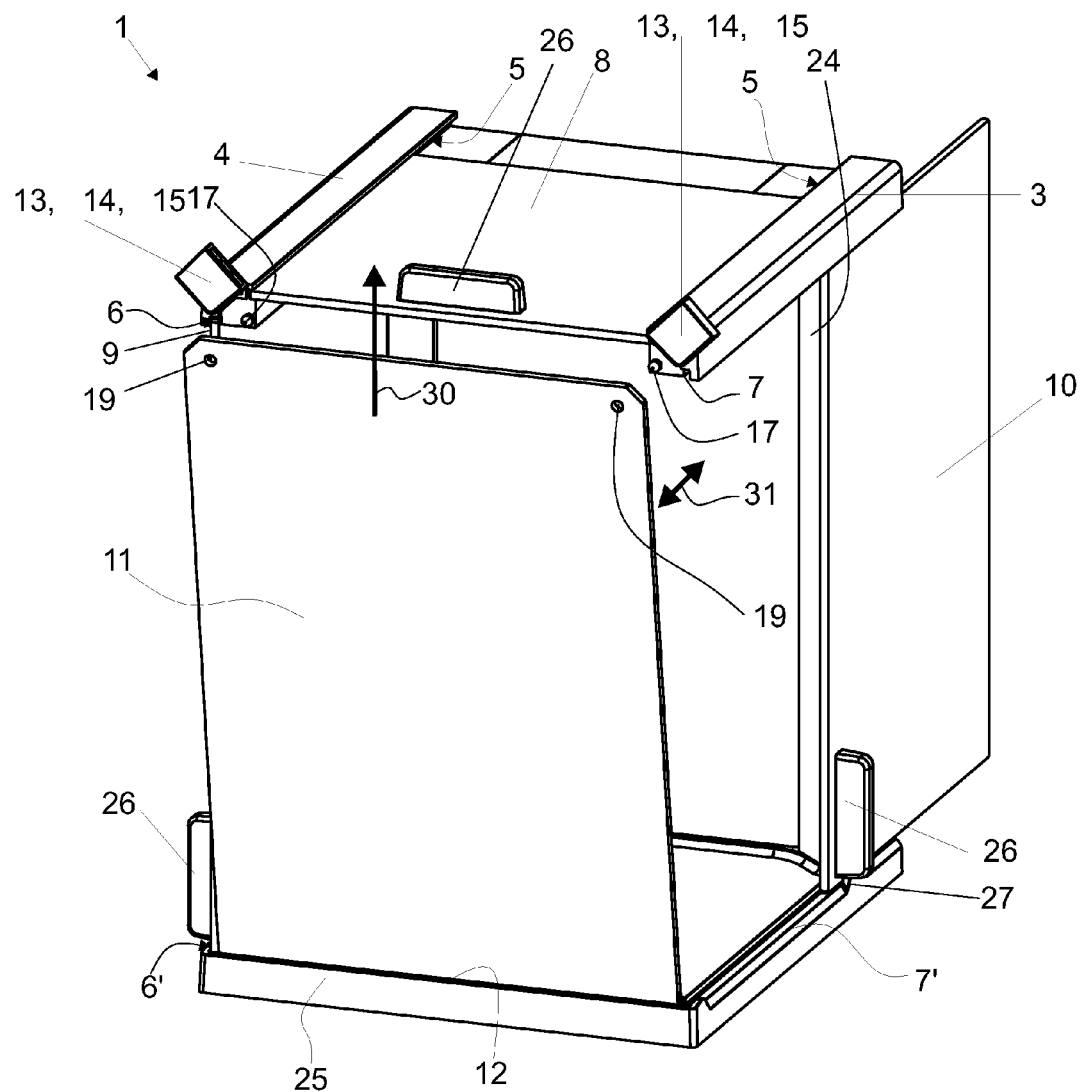
FIG. 2 represents a draft shield with the front wall released.

FIG. 2 shows an exemplary draft shield 1 wherein the front wall 11 has been released and then pivoted forward, as indicated by the double arrow 31, so that the panel 11 is free to be pulled out in the direction of the arrow 30. The reference symbols for some of the parts that are identical to the parts of FIG. 1, are not repeated here. This illustration shows the locking elements 13 with their holder elements 14 in the released position 15. This allows the front wall 11 to be pivoted forward, so that it can be easily removed. The sidewalls 9, 10 and the top cover panel 8 can then be pulled forward and out of the guide tracks 5, 6, 6', 7, 7' in order to subject them to a cleaning process of for various other reasons. For subsequent reassembly the reverse procedure is used.

When the locking elements 13 are swiveled into their released position 15, the ends of the guide tracks 6, 7 are exposed, as well as the projections 17, which fit into openings 19 at the corners of the front wall 11 in order to ensure that the front wall 11 is seated in its exact place in the locked position 16 (see FIG. 1).

Figure 3:
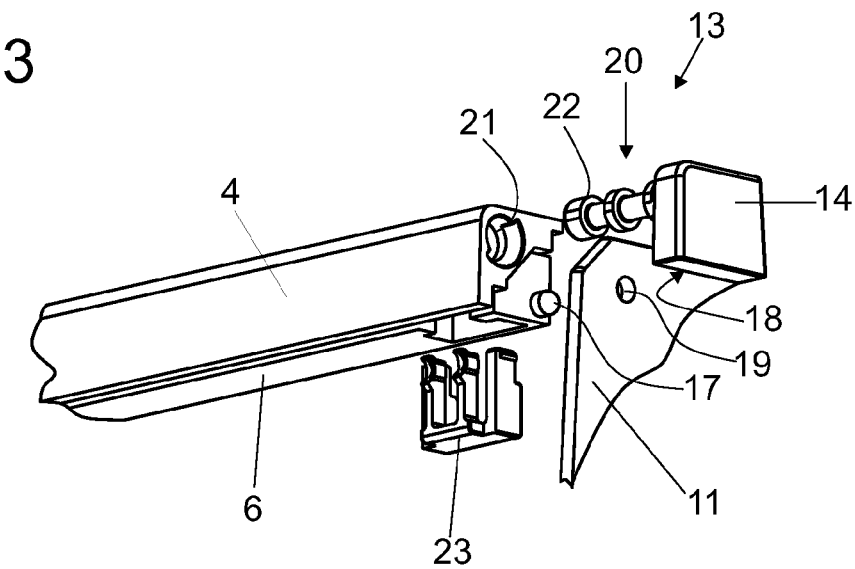
FIG. 3 shows details of a locking arrangement.

FIG. 3 illustrates details of an exemplary locking element 13. Shown here is a rail 4 with a guide track 6 for a sidewall 9, as well as the end portion of the rail 4. The locking element 13 is installed by pushing a pivot axle 20 of the locking element 13 into a hole 21 in the end portion of the rail. Then, a retaining element 23, which is configured to secure the locking element through engagement with at least one raised collar 22, is inserted from the side, from above, or from below.

This representation also makes it evident how the projection 17 can reach through an opening 19 at a corner of the front wall 11, so that when the locking element 13 is assembled and in the locked position 16, the projection 17 can engage a recess 18 that is formed on the backside of the holder element 14. In a spring-biased mechanism, this will lead to a clearly perceptible snap engagement.

Figure 4:
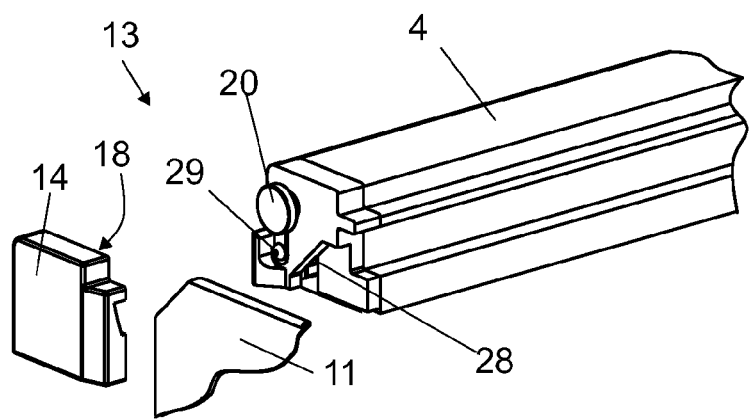
FIG. 4 shows an alternative design of a locking arrangement.

FIG. 4 shows an alternative embodiment of a locking device 13. In this arrangement, a corner of the front wall 11 is fitted into a seating recess 28 where the front wall 11 is locked into position. The locking device used here consists of an axle 20 which is held in the rail 4 and on which a holder element 14 is arranged. The holder element 14 is shown separated from the axle 20 so that a detent element 29 can be seen. The latter can, for example, have the form of a spherical ball which cooperates with a recess 18 on the backside of the holder element 14. The spherical ball or the holder element 14 and axle 20 can be spring-biased. In this case, the rotary detent serves to signal to the operator when the holder element has snapped into the locked position 16.

LIST OF REFERENCE SYMBOLS USED HEREIN

1 draft shield
2 rear wall
3 rail
4 rail
5 guide track for top cover panel
6, 6' guide tracks for sidewalls
7, 7' guide tracks for sidewalls
8 top cover panel
9 sidewall
10 sidewall
11 front wall
12 seat
13 locking elements
14 holder elements
15 released position
16 locked position
17 projections
18 recesses
19 openings
20 pivot axles
21 bore holes
22 stepped-off collar
23 retaining element
24 frame surrounding the rear wall
25 floor plate
26 handle
27 end stop
28 seating recess to receive the corner of the front wall
29 detent element
30 arrow indicating the pulling out of the front wall
31 double arrow indicating the pivoting of the front wall for dismantling or installation While certain embodiments of the present invention are described in detail above, the scope of the invention is not to be considered limited by such disclosure, and modifications are possible without departing from the spirit of the invention as evidenced by the following claims:

What is claimed is:

1. A draft shield for a balance, comprising an assembly of:
   a rear wall;
   rails extending forward from top corners of the rear wall, the rails containing guide tracks for a top cover panel and two sidewalls;
   locking elements arranged at front ends of the rails;
   a top cover panel slidably installed into corresponding guide tracks in the rails;
   two sidewalls, each sidewall slidably installed into corresponding guide tracks in the rails;
   a seat for receiving a portion of a front wall; and
   a front wall having its bottom edge inserted into the seat, the front wall secured in flush alignment against the top cover panel and the sidewalls by the locking elements;
   wherein the sidewalls and/or the top cover panel are fully removable from the remainder of the assembly by pulling the same forward through the respective guide tracks and out the front ends of the rails when the locking elements are released.

2. The draft shield according to claim 1, wherein top and side edges of the front wall lie snugly against corresponding faces of the top cover panel and sidewalls, respectively, when the front wall is in a closed condition.

3. The draft shield according to claim 1, wherein at least one side of the draft shield can be opened by sliding a sidewall rearward.

4. The draft shield according to claim 1, wherein the draft shield can be opened at the top by sliding the top cover panel rearward.

5. The draft shield according to claim 3, further comprising an end stop on each sidewall that retains a portion of the sidewall in its guide track when the sidewall is in a fully opened position.

6. The draft shield according to claim 4, further comprising an end stop on the top cover panel that retains a portion of the top cover panel in its guide track when the top cover panel is in a fully opened position.

7. The draft shield according to claim 1, wherein the sidewalls and/or top cover panel are equipped with a handle to facilitate a sliding movement thereof.

8. The draft shield according to claim 1, wherein the locking elements comprise holder elements that are swivelable between a release position and a locked position of the front wall.

9. The draft shield according to claim 8, wherein the holder elements are spring-biased in a holding direction and, during a locking movement thereof, sloped glide ramps create spring tension that produces a holding force.

10. The draft shield according to claim 8, wherein the holder elements are configured as rotary detent elements.

11. The draft shield according to claim 10, wherein the rails include projections and the detent elements include recesses that are engaged by the projections when the detent elements are in a closed condition.

12. The draft shield according to claim 11, wherein the projections extend from ends of the rails, and wherein the front wall, at its upper corners, has openings through which the projections pass before entering into the recesses in the detent elements to establish engagement therewith.

13. The draft shield according to claim 8, wherein the holder elements include pivot axles that are configured for insertion into bore holes in the rails, the pivot axles retained in the bore holes by engagement of at least one stepped-off collar on the pivot axles and corresponding retaining elements.

14. The draft shield according to claim 1, wherein the rear wall is fastened to the balance and the seat for the front wall is arranged at the topside of the balance.

15. The draft shield according to claim 1, wherein the sidewalls are also guided at bottom edges thereof by means of guide tracks that are located on a topside of the balance.

16. The draft shield according to claim 1, wherein the rear wall is enclosed by a frame.

17. The draft shield according to claim 1, wherein the rear wall is supported by a floor plate and the floor plate can be set on top of the balance.

18. The draft shield according to claim 17, wherein the floor plate includes guide tracks for bottom edges of the sidewalls, and further comprises the seat for the front wall.

19. A draft shield for a balance, comprising an assembly of:
a rear wall;
rails extending forward from top corners of the rear wall, the rails containing guide tracks for the slidable retention of a top cover panel and two sidewalls;
a top cover panel slidably installed into corresponding guide tracks in the rails;
two sidewalls, each sidewall slidably installed into a corresponding guide track in the rails;
a seat for receiving a bottom edge of a front wall;
a front wall having its bottom edge pivotably inserted into the seat, the front wall also in flush alignment against the top cover panel and the sidewalls when in a closed position; and
locking elements arranged at front ends of the rails, the locking elements rotatable between an unlocked position wherein the front wall is freely pivotable and the top wall and/or side walls are fully removable from the remainder of the assembly by pulling the same forward within the respective guide tracks, and a locked position wherein the locking elements engage and secure the front wall in its closed position and directly prohibit forward movement of the top wall and side walls beyond the front ends of the rails.

20. A draft shield for a balance, comprising an assembly of:
a rear wall;
rails extending forward from top corners of the rear wall, the rails containing guide tracks that extend through front ends of the rails for the slidable retention of a removable top cover panel and two removable sidewalls;
a removable top cover panel slidably installed into corresponding guide tracks in the rails;
two removable sidewalls, each sidewall slidably installed into a corresponding guide track in the rails;
a seat for receiving a bottom edge of a removable front wall;
a removable front wall having its bottom edge pivotably inserted into the seat, the front wall also in flush alignment against the top cover panel and the sidewalls when in a closed position; and
a locking element arranged at the front end of each rail, each locking element independently rotatable between an unlocked position and a locked position, such that unlocking of a single locking element permits the slidable removal of a corresponding sidewall from the remainder of the assembly, unlocking of both locking elements permits the slidable removal of both sidewalls and the top wall from the remainder of the assembly, and wherein each locking element functions to engage and secure the front wall in its closed position and to directly prohibit forward movement of the top wall and a corresponding one of the sidewalls beyond the front ends of the rails when in its locked position.

21. The draft shield of claim 1, wherein the front wall can be pivoted into flush alignment against the top cover panel and the sidewalls after its bottom edge has been inserted into the seat.

22. The draft shield of claim 19, wherein the front wall can be pivoted into the closed position after its bottom edge has been pivotably inserted into the seat.

23. The draft shield of claim 20, wherein the front wall can be pivoted into the closed position after its bottom edge has been pivotably inserted into the seat.

* * * * *